(12) United States Patent
Clark

(10) Patent No.: US 11,924,062 B2
(45) Date of Patent: Mar. 5, 2024

(54) SYSTEMS AND METHODS FOR AUTOMATED SD-WAN PERFORMANCE RULE FORMATION

(71) Applicant: Fortinet, Inc., Sunnyvale, CA (US)

(72) Inventor: Reid Garrett Clark, Laguna Nigel, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/683,977

(22) Filed: Mar. 1, 2022

(65) Prior Publication Data
US 2023/0283533 A1 Sep. 7, 2023

(51) Int. Cl.
*H04L 41/5009* (2022.01)
*H04L 41/5003* (2022.01)
*H04L 43/00* (2022.01)

(52) U.S. Cl.
CPC ...... *H04L 41/5009* (2013.01); *H04L 41/5003* (2013.01); *H04L 43/14* (2013.01)

(58) Field of Classification Search
CPC .. H04L 41/5009; H04L 41/5003; H04L 43/14
USPC .......................................................... 709/231
See application file for complete search history.

(56) References Cited

U.S. PATENT DOCUMENTS 11,381,474 B1 * 7/2022 Kumar ................ H04L 41/0896
2021/0314238 A1 * 10/2021 Cioffi .................. H04L 41/5006

* cited by examiner

*Primary Examiner* — Karen C Tang
(74) *Attorney, Agent, or Firm* — Jaffery Watson Mendonsa & Hamilton LLP

(57) ABSTRACT

Systems, devices, and methods are discussed for defining and monitoring network communication performance in an SD-WAN environment.

18 Claims, 4 Drawing Sheets

SYSTEMS AND METHODS FOR AUTOMATED SD-WAN PERFORMANCE RULE FORMATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2022, Fortinet, Inc.

FIELD

Embodiments discussed generally relate to systems and methods for maintaining a defined level of network communication performance, and more particularly to systems and methods for defining and monitoring network communication performance in an SD-WAN environment.

BACKGROUND

A software-defined wide area network (SD-WAN) utilizes a number of service providers each providing communication services in accordance with a service level agreement (SLA). This allows the SD-WAN to route traffic based upon, for example, the lowest cost for the required level of service. To make effective use of this capability, a network administrator must characterize the required level of service for each service accessed or process to be performed via a communication network. This often results in defining a service level that is either too high or too low. Such improper definition can result in improper path selection for a given service access or process performed or an inability for the SD-WAN to identify a service provider that can provide the capability within the defined service level constraints.

Hence, there exists a need in the art for advanced approaches for automatically defining service levels for a given network accessible service.

SUMMARY

Various embodiments provide systems and methods for maintaining a defined level of network communication performance, and more particularly to systems and methods for defining and monitoring network communication performance in an SD-WAN environment.

This summary provides only a general outline of some embodiments. Many other objects, features, advantages, and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
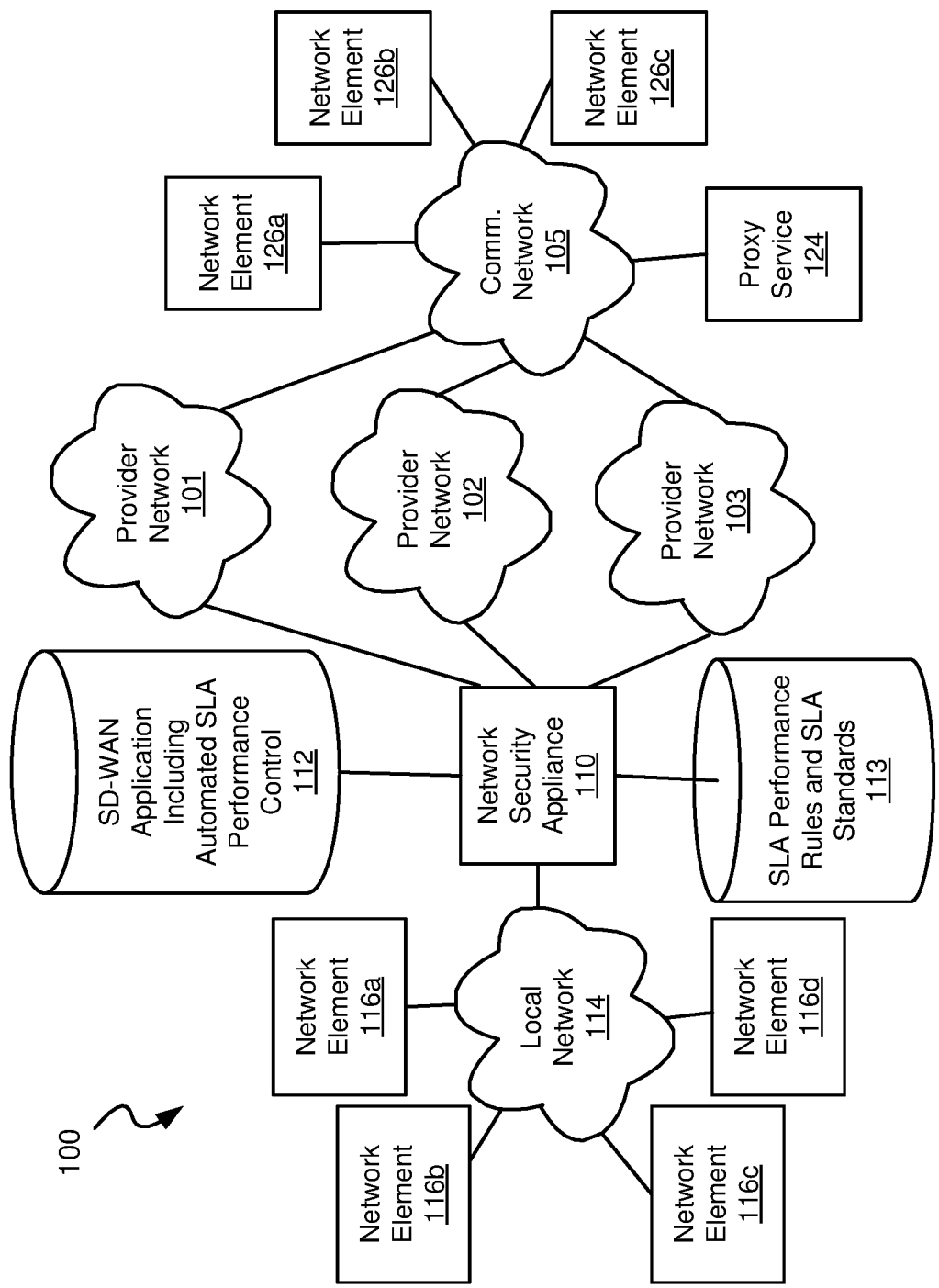
FIGS. 1A-1C illustrate a network architecture including an SD-WAN communication system capable of automatically defining service level performance rules for particular network accessible service or process, and selecting a communication path based at least in part on the automatically defined service level performance rules in accordance with some embodiments.

Various embodiments provide systems and methods for maintaining a defined level of network communication performance, and more particularly to systems and methods for defining and monitoring network communication performance in an SD-WAN environment.

Various embodiments utilize multiple network communication paths supported by different service providers based at least in part on whether the SLA of the selected service provider can meet the SLA performance rule for the particular network accessible service or process being directed to a network communication path supported by the selected service provider. Thus, for example, an audio conference call service may have an SLA performance rule that defines stringent levels for jitter and latency, but defines a relatively loose level for bandwidth. In such a case, a service provider offering a low latency, low jitter SLA may be selected. As another example, access to a document processing service may have an SLA performance rule that defines a mid-range bandwidth and a low latency, but is not sensitive to jitter. In such a case, a service provider offering a high bandwidth and a low latency without regard for jitter SLA may be selected. Based upon the disclosure provided herein, one of ordinary skill in the art will recognize a variety of combinations of network communication service levels that may be defined for a particular network accessible service and/or process that may be used in relation to different embodiments.

In some embodiments, the SLA performance rule for one or more network accessible services or processes are automatically defined. In some such embodiments, a proxy service aggregates service level performance criteria for a number of network accessible services or processes. In such a case, when a particular network accessible service or process is to be used, an access to the proxy server is made where various rules for accessing the particular network accessible service or process are maintained. This information is then used to automatically form a service level performance rule for the proxy which is used by the SD-WAN to select a communication path supported by a service provider with an SLA that meets or exceeds the criteria defined in the service level performance rule. In various embodiments, the service level performance criteria for a given network accessible service or process are maintained by an SD-WAN. In such a case, when a particular network accessible service or process is to be used, the SD-WAN uses the service level performance criteria to automatically define a service level performance rule for the particular network accessible service or process. This service level performance rule is used by the SD-WAN to select a communication path supported by a service provider with an SLA that meets or exceeds the criteria defined in the service level performance rule.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", a "network element", or a "network device" generally refers to a device or appliance in virtual or physical form that is operable to perform one or more network functions. In some cases, a network appliance may be a database, a network server, or the like. Some network devices may be implemented as general-purpose computers or servers with appropriate software operable to perform the one or more network functions. Other network devices may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance" or a network security device" that may reside within the particular network that it is protecting, or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/ gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, the phrases "network path", "communication path", or "network communication path" generally refer to a path whereby information may be sent from one end and received on the other. In some embodiments, such paths are referred to commonly as tunnels which are configured and provisioned as is known in the art. Such paths may traverse, but are not limited to traversing, wired or wireless communication links, wide area network (WAN) communication links, local area network (LAN) communication links, and/or combinations of the aforementioned. Based upon the disclosure provided herein, one of ordinary skill in the art will recognize a variety of communication paths and/or combinations of communication paths that may be used in relation to different embodiments.

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

The phrase "network accessible service" "or "network accessible process" may be any service or process accessible via a communication network. As an example, a network accessible service may be an audio communication and/or video communication service such as, for example, Zoom™ that allows two or more end users to communicate over a communication network. As another example, a network accessible service may be a word processing service such as, for example, Office365™. Based upon the disclosure provided herein, one of ordinary skill in the art will recognize a variety of network accessible services and/or network accessible processes that may be used in relation to different embodiments.

The phrase "SLA standards" is used in its broadest sense to mean any performance parameters corresponding to a service level provided by a communication service provider. In some embodiments, such SLA standards are indicated by a service provider to assure sufficient service level of a communication service provider to allow the service to perform properly. Such SLA standards may include, but are not limited to, bandwidth level, jitter level, and/or latency level. Based upon the disclosure provided herein, one of ordinary skill in the art will recognize a variety of performance standards may be included in SLA standards. The phrase "SLA performance rules" is used in its broadest sense to mean any performance rules that define a service level of a communication service provider that are suggested to assure proper operation of a network accessible service from a network. Such SLA performance rules may include, but are not limited to, bandwidth level, jitter level, and/or latency level. Based upon the disclosure provided herein, one of ordinary skill in the art will recognize a variety of performance parameters may be included in SLA performance rules.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views of processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods for automatically defining a communication path performance rule in an SD-WAN environment. Such methods include: receiving, by a processing resource, a request to modify a control related to a network accessible service; automatically accessing, by the processing resource, a performance standard associated with the network accessible service based at least in part on the request to modify the control; and creating, by the processing resource, the communication path performance rule for the network accessible service. The communication path performance rule is not part of the control related to the network accessible service.

In some instances of the aforementioned embodiments, the methods further include: creating, by the processing resource, a control rule for the network accessible service. The control rule corresponds to the control related to the network accessible service. In some such instances, the communication path performance rule governs the provider network by which the network accessible service is accessed, and the control rule governs interaction with the network accessible service exclusive of the provider network. In various such instances, the control rule is a security rule. In one or more cases of the aforementioned instances, the methods further include: storing, by the processing resource, both the control rule and the communication path performance rule as part of a control group for the network accessible service.

In various instances of the aforementioned embodiments where the SD-WAN environment includes at least a first communication path exhibiting a first performance and a second communication path exhibiting a second performance, the methods further include: comparing, by the processing resource, the first performance with the communication path performance rule; and selecting, by the processing resource, the first communication path based at least in part on the comparison of the first performance with the communication path performance rule. In some such instances, the first communication path includes a first provider network, and wherein the second communication path includes a second provider network. In various such instances, the control rule is a security rule that is unrelated to the selected first communication path.

Some instances of the aforementioned embodiments where the SD-WAN environment includes at least a first communication path exhibiting a first performance and a second communication path exhibiting a second performance, and the methods further include: comparing, by the processing resource, the second performance with the communication path performance rule; and selecting, by the processing resource, the second communication path based at least in part on the comparison of the second performance with the communication path performance rule.

In various instances of the aforementioned embodiments, the performance standard includes at least one performance metric recommended by a provider of the network accessible service. In some instances of the aforementioned embodiments, the performance standard includes one or more performance parameters selected from: a communication path bandwidth level, a communication path latency level, and/or a communication path jitter level. In various instances of the aforementioned embodiments, the performance standard associated with the network accessible service is accessed from a proxy service that includes both the actual name of the network accessible service and the performance standard corresponding to the network accessible service.

Other embodiments provide systems for automatically defining a communication path performance rule in an SD-WAN environment. The systems include: a processing resource, and a non-transient computer readable medium. The non-transient computer readable medium is coupled to the processing resource and has stored therein instructions that when executed by the processing resource cause the processing resource to: receive a request to modify a control related to a network accessible service; automatically access a performance standard associated with the network accessible service based at least in part on the request to modify the control; and create the communication path performance rule for the network accessible service. The communication path performance rule is not part of the control related to the network accessible service.

Yet other embodiments provide non-transient computer readable media each having stored therein instructions that when executed by the processing resource cause the processing resource to: receive a request to modify a control related to a network accessible service; automatically access a performance standard associated with the network accessible service based at least in part on the request to modify the control; and create the communication path performance rule for the network accessible service. The communication path performance rule is not part of the control related to the network accessible service.

Turning to FIG. 1A, network architecture 100 is shown that includes an SD-WAN communication system capable of automatically defining service level performance rules for particular network accessible service or process, and selecting a communication path based at least in part on the automatically defined service level performance rules in accordance with some embodiments. In the context of network architecture 100, a number of network elements (e.g., a network element 116a, a network element 116b, a network element 116c, a network element 116d, a network element 126a, a network element 126, and a network element 126c) are coupled to respective networks (e.g., a local network 114 and a communication network 105). Local network 114 and communication network 105 may respectively be any type of communication network known in the art. Those skilled in the art will appreciate that, local network 114 and/or communication network 105 can be wireless network, a wired network, or a combination thereof that can be implemented as one of the various types of networks, such as an Intranet, a Local Area Network (LAN), a Wide Area Network (WAN), an Internet, and the like. Further, local networks 114, 124 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Access to local network 114 is controlled by a network security appliance 110. A number of provider networks (e.g., a provider network 101, a provider network 102, and a provider network 103) couple local network 114 to communication network 105. Provider networks 101, 102, 103 are maintained by different providers under respective SLAs, and may be any type of communication network known in the art. Those skilled in the art will appreciate that, each of provider networks 101, 102, 103 can be wireless network, a wired network, or a combination thereof that can be implemented as one of the various types of networks, such as an Intranet, a Local Area Network (LAN), a Wide Area Network (WAN), an Internet, and the like. Further, provider networks 101, 102, 103 can either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Network security appliance 110 is coupled to a computer readable storage medium having stored thereon an SD-WAN application including automated service level performance control 112. As more fully described below, SD-WAN application including automated service level performance control 112 operates to automatically define service level performance rules to network accessible services and/or processes, and to assure that a provider network appropriate to an automatically defined service level rule is selected to perform communications in relation to access to the corresponding network accessible service and/or process. An SLA performance rules and SLA standards database 113 includes any SLA standards for network accessible services (e.g., a network accessible service supported by one of network element 126a, network element 126b, or network element 126c) that are maintained local to network security appliance 110, and SLA performance rules implemented in relation to the network accessible services.

Figure 1B:
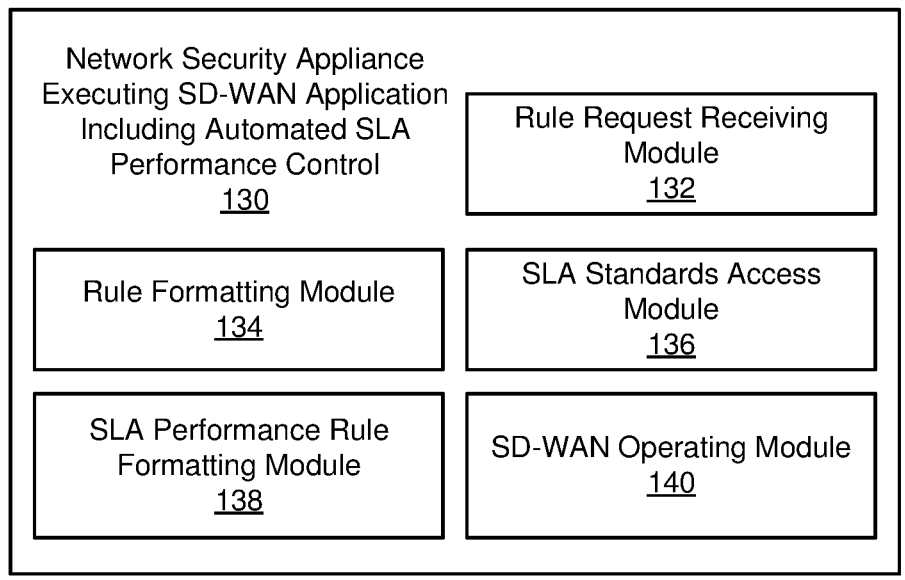

Turning to FIG. 1B, an example implementation of a network appliance executing an SD-WAN application including automated service level performance control 130 (e.g., network security appliance 110 executing SD-WAN application including automated service level performance control 112) is shown in accordance with some embodiments. As shown in this example, network appliance executing SD-WAN application including automated service level performance control 130 includes: a rule request receiving module 132, a rule formatting module 134, an SLA standards access module 136, an SLA performance rule formatting module 138, and an SD-WAN operating module 140.

Rule request receiving module 132 is configured to receive a request to implement a rule in relation to a particular network accessible service (e.g., a network accessible service supported by one of network element 126a, network element 126b, or network element 126c). This request may be received, for example, from a network element 116 supported by network security appliance 110, or by direct access to network security appliance 110. The request may be made, for example, by a network administrator setting up various rules for accesses to/from a communication network other than defining SLA performance rules. Thus, the request may include, for example, a request to define a security rule for a network accessible service. This may include defining what users can access of the network accessible service and/or inputting various access tokens for the network accessible service. Based upon the disclosure provided herein, one of ordinary skill in the art will recognize a variety of rules that may be defined to govern access to/from a network accessible service.

Rule formatting module 134 is configured to receive the requested rule implementation and to format the rule into a format accessible to and usable by network security appliance 110 to implement the rule. Any approach known in the art for formatting and storing a rule governing access to a respective network accessible service may be used in relation to different embodiments.

SLA standards access module 136 is configured to automatically gather SLA standards for a network accessible service that is the subject of another rule request. As such, a user does not need to identify the SLA standards, but rather, the process is automatically completed whenever another characterization of the network accessible service is performed. SLA standards access module 136 determines whether the requested rule is received in relation to a proxy for the network accessible service or to the actual network accessible service. This may be determined, for example, by accessing proxy service 124 supporting an SD-WAN application including automated SLA performance control 112. Where proxy service 124 does not include the name of the network accessible service included in the request to define the rule, proxy service 124 returns a not available response and network security appliance 110 assumes the requested rule is received in relation to the actual network accessible service. In such a case, network security appliance 110 accesses the SLA standards for the respective network accessible from SLA performance rules and SLA standards database 113. This local database may be periodically updated to include the most recent SLA standards suggested by a provider of the respective service. Alternatively, where proxy service 124 resolves and returns the actual address of the requested network accessible service, network security appliance 110 provides a request to proxy service 124 for the SLA standards for the network accessible service. Proxy service 124 may be periodically updated to include the most recent SLA standards suggested by a provider of the respective network accessible service.

SLA performance rule formatting module 138 is configured to receive the SLA standards and to format the SLA standards into a format accessible to and usable by network security appliance 110 to govern selection of and operation of a communication path between network security appliance 110 and the particular network accessible service. Any approach known in the art for formatting SLA standards to govern communication path selection and/or operation in an SD-WAN system may be used in relation to different embodiments.

SD-WAN operating module 140 is configured to determine which of multiple communication service providers (e.g., which of provider network 101, provider network 102, or provider network 103) will be used for accesses between network security appliance 110 and a particular network accessible service (e.g., a network accessible service supported by one of network element 126a, network element 126b, or network element 126c). In operation, SD-WAN operating module 140 receives a request to access a particular network accessible service or process (e.g., a network accessible service supported by one of network element 126a, network element 126b, or network element 126c). This request indicates the particular network accessible service or process, or a proxy for the same network accessible service or process. Thus, for example, where the network accessible service is Zoom™, the request may indicate the actual service (i.e., www.zoom.us) or a proxy thereof (e.g., www.proxyforzoom.com).

SD-WAN operating module 140 accesses the SLA performance rule for the request network accessible service. The accessed SLA performance rules may be automatically defined by a combination of SLA standards access module 136 and SLA performance rule formatting module 138. SD-WAN operating module 140 selects a communication service provider offering a service level consistent with the SLA performance rule to service accesses to/from the network accessible service and network security appliance 110. This may be done using any approach known in the art for selecting a communication service provider with an appropriate SLA and establishing a communication path to via the selected communication service provider.

SD-WAN operating module 140 monitors the operational status of the established connection to assure that the selected communication service provider is providing a service level at least sufficient to meet the SLA performance rules. Where SD-WAN operating module 140 determines that the selected communication service provider is providing a service level at least sufficient to meet the SLA performance rules, accesses between network security appliance 110 and the network accessible service continue over the same communication path. However, where SD-WAN operating module 140 determines that the selected communication service provider is not providing a service level at least sufficient to meet the SLA performance rules, SD-WAN operating module 140 identifies a replacement communication service provider and establishes a new connection between network security appliance 110 and the network accessible service.

Figure 1C:
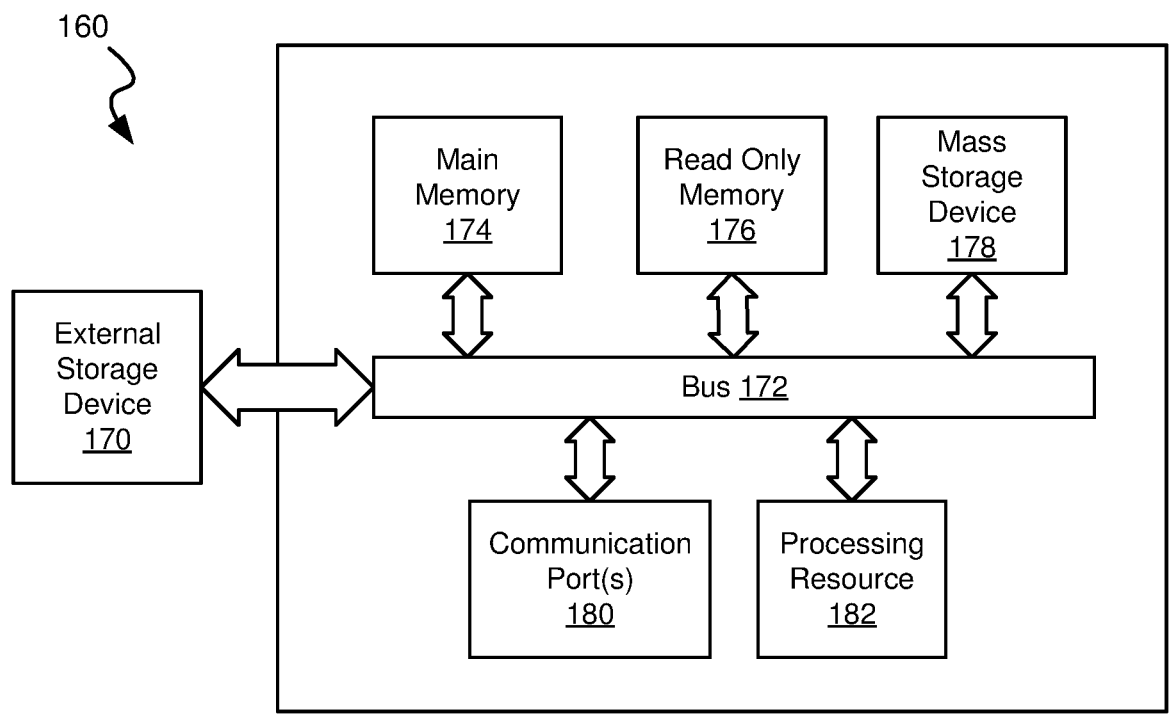

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182). In one embodiment, computer system 160 may represent some portion of network elements 116, 126, and/or network security appliances 110, 120.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25 G, 40 G, and 100 G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g., start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such as front side bus (FSB), which connects processing resources to software systems.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 190 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer systems limit the scope of the present disclosure.

Figure 2:
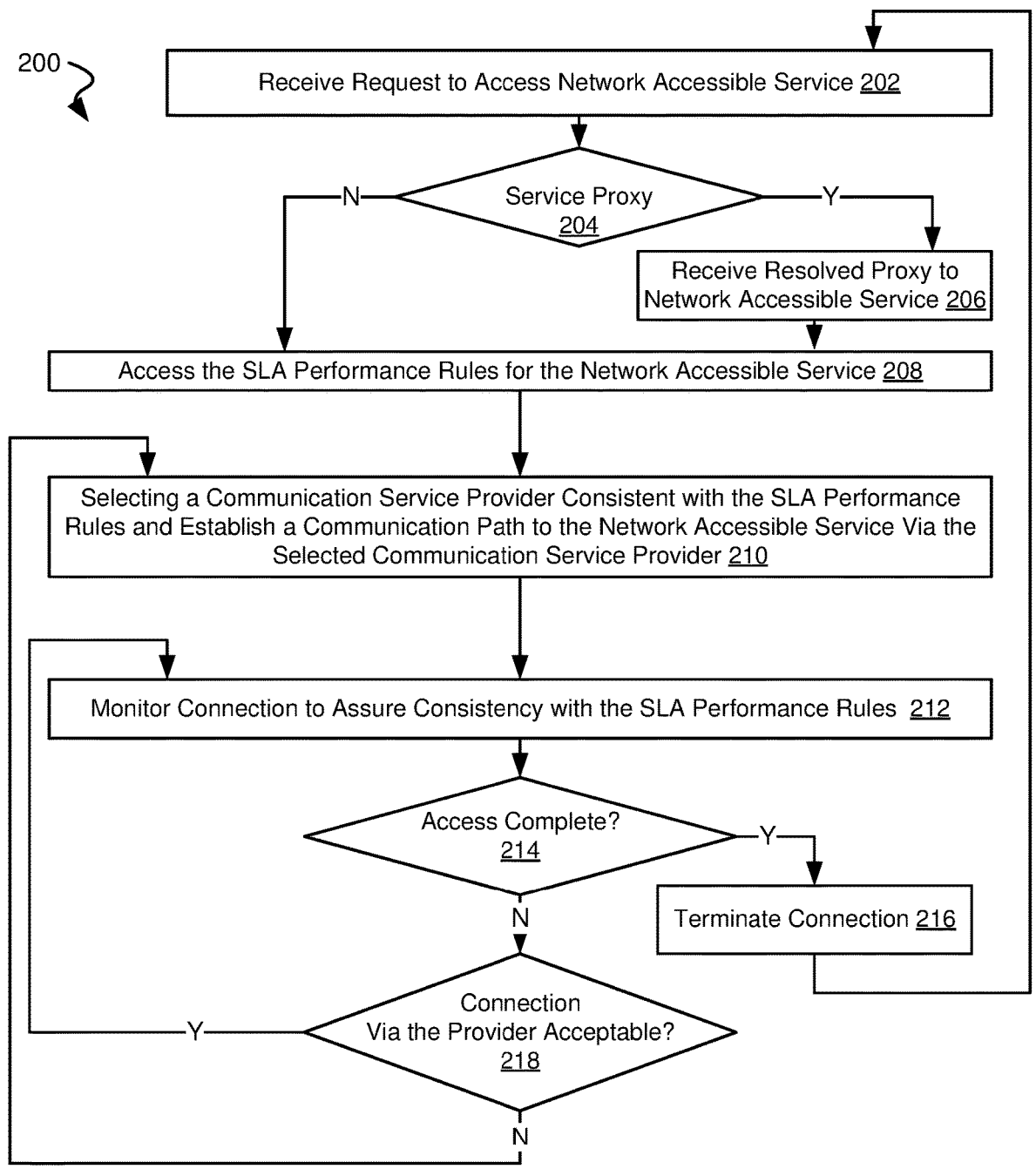
FIG. 2 is a flow diagram showing method for selecting and monitoring a communication path for a selected network accessible service or process based at least in part on an automatically defined service level rule in accordance with various embodiments.

Turning to FIG. 2, a flow diagram 200 shows a method for selecting and monitoring a communication path for a selected network accessible service or process based at least in part on an automatically defined service level rule in accordance with various embodiments. Following flow diagram 200, a request to access a network accessible service or process is received (block 202). This request indicates the particular network accessible service or process, or a proxy for the same network accessible service or process. Thus, for example, where the network accessible service is Zoom™, the request may indicate the actual service (i.e., www.zoom.us) or a proxy thereof (e.g., www.proxyforzoom.com).

It is determined whether the access request is directed to a proxy for the network accessible service or to the network accessible service directly (block 204). This may be determined, for example, by accessing a proxy service supporting an SD-WAN setup application. Where the proxy service includes the proxy indicated in the request (block 204), the proxy service resolves and returns the actual address of the requested network accessible service (block 206). Alternatively, where the proxy service does not include the proxy indicated in the request (block 204), the proxy service returns a null. SLA performance rules for the network accessible service are accessed (block 208). The accessed SLA performance rules may be automatically defined using a method similar to that discussed below in relation to FIG. 3.

A communication service provider offering a service level consistent with the SLA performance rule is selected to service accesses to/from the network accessible service, and a connection is opened via the selected communication service provider (block 210). This may be done using any approach known in the art for selecting a communication service provider with an appropriate SLA and establishing a communication path to via the selected communication service provider. With this communication path in place (block 210), communications between the network and the network accessible service continue over the connection.

Operational status of the established connection is monitored to assure that the selected communication service provider is providing a service level at least sufficient to meet the SLA performance rules (block 212). This monitoring may be done using any approach known in the art. It is determined whether the requested access to the network accessible service has been completed (block 214). Where access has completed (block 214), the connection is terminated (block 216).

Alternatively, where access has not completed (block 214), it is determined whether the selected communication service provider is providing a service level at least sufficient to meet the SLA performance rules (block 218). Where the selected communication service provider is providing a service level at least sufficient to meet the SLA performance rules (block 218), accesses between the network and the network accessible service continue over the same communication path as the processes of blocks 212-218 repeat.

In contrast, where the selected communication service provider is not providing a service level at least sufficient to meet the SLA performance rules (block 218), the process of block 210 is repeated to identify a replacement communication service provider and establish a new connection between the network and the network accessible service.

Figure 3:
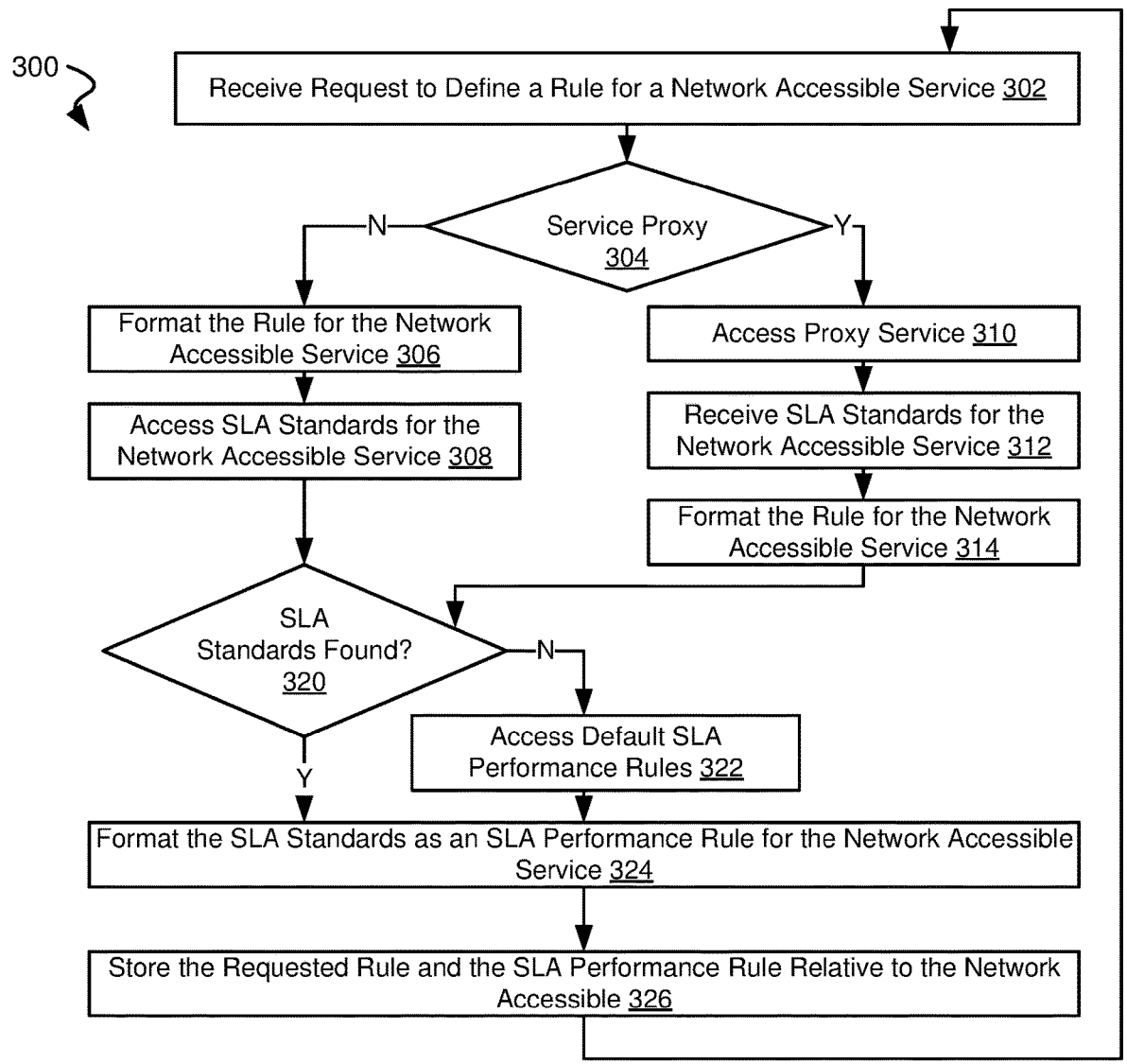
FIG. 3 shows a method for automatically defining a service level rule for a selected network accessible service or process in accordance with some embodiments.

Turning to FIG. 3, a flow diagram 300 shows a method for automatically defining a service level rule for a selected network accessible service or process in accordance with some embodiments. Following flow diagram 300, a request is received to define a rule for a network accessible service (block 302). This request may be made, for example, by a network administrator setting up various rules for accesses to/from a communication network. Thus, the request may include, for example, a request to define a security rule for a network accessible service. This may include defining what users can access of the network accessible service and/or inputting various access tokens for the network accessible service. Any rule known in the art for governing access to/from a network accessible service may be requested in the process of block 302. Based upon the disclosure provided herein, one of ordinary skill in the art will recognize a variety of rules that may be defined to govern access to/from a network accessible service.

It is determined whether the network accessible service is identified as the actual service or a proxy for the actual service (block 304). This may be determined, for example, by accessing a proxy service supporting an SD-WAN setup application. Where the proxy service does not include the name of the network accessible service included in the request to define the rule (block 304), the proxy service returns a not available response. In response to this, the rule received as part of the request to define the rule for the network accessible service is formatted and included as part of the rules for accesses to/from the respective network accessible service (block 306). Any approach known in the art for formatting and storing a rule governing access to a respective network accessible service may be used in relation to different embodiments. In addition, SLA standards for the respective network accessible service are accessed from a local database (block 308). This local database may be periodically updated to include the most recent SLA standards suggested by a provider of the respective service.

It is determined whether the SLA standards were found for the network accessible service (block 320). In this case where the SLA standards are accessed from the local database, determination of whether the SLA standards were found is based upon whether the database included an SLA standards for the particular network accessible service. Where the SLA standards were not found (block 320), default SLA standards are accessed for the network accessible service (block 322). The default SLA standards may define performance standards that are generally used and/or matched by two or more communication service providers, or the default SLA standards may be selected by querying the user that issued the request. Based upon the disclosure provided herein, one of ordinary skill in the art will understand a variety of default parameters that may be selected to define default SLA standards.

The SLA standards (either those provided for the network accessible service or default standards) are formatted as an SLA performance rule for the network accessible service (block 324). Any formatting known in the art may be used to place the SLA standards in a form recognizable to the network where they are used. The formatted requested rule (block 306) and the formatted SLA standards (block 324) are stored in a database of the network where they will be applied for use whenever access to the particular network accessible service is provisioned (block 326).

Alternatively, where the proxy service returns the actual address of the requested network accessible service (block 304), a request is provided to the proxy service to provide the SLA standards for the network accessible service (block 310). In response, the SLA standards for the network accessible service are received where they are available (block 312). This proxy service may be periodically updated to include the most recent SLA standards suggested by a provider of the respective network accessible service. The rule received as part of the request to define the rule for the network accessible service is formatted and included as part of the rules for accesses to/from the respective network accessible service (block 314). Any approach known in the art for formatting and storing a rule governing access to a respective network accessible service may be used in relation to different embodiments.

It is determined whether the SLA standards were found for the network accessible service (block 320). In this case where the SLA standards are received from the proxy service, determination of whether the SLA standards were found is based upon whether the proxy service provided the SLA standards for the particular network accessible service. Where the SLA standards were not found (block 320), default SLA standards are accessed for the network accessible service (block 322). The default SLA standards may define performance standards that are generally used and/or matched by two or more communication service providers, or the default SLA standards may be selected by querying the user that issued the request. Based upon the disclosure provided herein, one of ordinary skill in the art will understand a variety of default parameters that may be selected to define default SLA standards.

The SLA standards (either those received from the proxy service for the network accessible service or default standards) are formatted as an SLA performance rule for the network accessible service (block 324). Any formatting known in the art may be used to place the SLA standards in a form recognizable to the network where they are used. The formatted requested rule (block 306) and the formatted SLA standards (block 324) are stored in a database of the network where they will be applied for use whenever access to the particular network accessible service is provisioned (block 326).

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for automatically defining a communication path performance rule in an SD-WAN environment, the method comprising:

receiving, by a processing resource, a request to modify a control related to a network accessible service;

automatically accessing, by the processing resource, a performance standard associated with the network accessible service based at least in part on the request to modify the control, wherein the performance standard defines parameters for at least: bandwidth, latency and jitter; and creating, by the processing resource, the communication path performance rule for the network accessible service according to the parameters of the performance standard, wherein the communication path performance rule is not part of the control related to the network accessible service; and creating, by the processing resource, a control rule for the network accessible service, wherein the control rule is a security rule that corresponds to the control related to the network accessible service, wherein the communication path performance rule governs the provider network by which the network accessible service is accessed, and the control rule governs interaction with the network accessible service exclusive of the provider network.

2. The method of claim 1, the method further comprising: storing, by the processing resource, both the control rule and the communication path performance rule as part of a control group for the network accessible service.

3. The method of claim 1, wherein the SD-WAN environment includes at least a first communication path exhibiting a first performance and a second communication path exhibiting a second performance, and wherein the method further comprising:

comparing, by the processing resource, the first performance with the communication path performance rule; and selecting, by the processing resource, the first communication path based at least in part on the comparison of the first performance with the communication path performance rule.

4. The method of claim 3, wherein the first communication path includes a first provider network, and wherein the second communication path includes a second provider network.

5. The method of claim 3, wherein the security rule is unrelated to the selected first communication path.

6. The method of claim 1, wherein the SD-WAN environment includes at least a first communication path exhibiting a first performance and a second communication path exhibiting a second performance, and wherein the method further comprising:

comparing, by the processing resource, the second performance with the communication path performance rule; and selecting, by the processing resource, the second communication path based at least in part on the comparison of the second performance with the communication path performance rule.

7. The method of claim 1, wherein the performance standard includes at least one performance metric recommended by a provider of the network accessible service.

8. The method of claim 1, wherein the performance standard includes one or more performance parameters selected from a group consisting of: a communication path bandwidth level, a communication path latency level, and a communication path jitter level.

9. The method of claim 1, wherein the performance standard associated with the network accessible service is accessed from a proxy service that includes both the actual name of the network accessible service and the performance standard corresponding to the network accessible service.

10. A system for automatically defining a communication path performance rule in an SD-WAN environment, the system comprising:

a processing resource;

a non-transient computer readable medium coupled to the processing resource and having stored therein instructions that when executed by the processing resource cause the processing resource to:

receive a request to modify a control related to a network accessible service;

automatically access a performance standard associated with the network accessible service based at least in part on the request to modify the control, wherein the performance standard defines parameters for at least: bandwidth, latency and jitter;

create the communication path performance rule for the network accessible service according to the parameters of the performance standard, wherein the communication path performance rule is not part of the control related to the network accessible service; and create a control rule for the network accessible service, wherein the control rule corresponds to the control related to the network accessible service, and wherein the communication path performance rule governs the provider network by which the network accessible service is accessed, and the control rule governs interaction with the network accessible service exclusive of the provider network.

11. The system of claim 10, wherein the instructions that when executed by the processing resource further cause the processing resource to:

store both the control rule and the communication path performance rule as part of a control group for the network accessible service.

12. The system of claim 11, wherein the control rule is a security rule.

13. The system of claim 10 wherein the SD-WAN environment includes at least a first communication path exhibiting a first performance and a second communication path exhibiting a second performance, and wherein the instructions that when executed by the processing resource further cause the processing resource to:

compare the first performance with the communication path performance rule; and select the first communication path based at least in part on the comparison of the first performance with the communication path performance rule.

14. The system of claim 13, wherein the first communication path includes a first provider network, and wherein the second communication path includes a second provider network.

15. The system of claim 10, wherein the performance standard includes one or more performance parameters selected from a group consisting of: a communication path bandwidth level, a communication path latency level, and a communication path jitter level.

16. The system of claim 10, wherein the performance standard associated with the network accessible service is accessed from a proxy service that includes both the actual name of the network accessible service and the performance standard corresponding to the network accessible service.

17. A non-transient computer readable medium having stored therein instructions that when executed by the processing resource cause the processing resource to:

receive a request to modify a control related to a network accessible service;

automatically accessing, by the processing resource, a performance standard associated with the network accessible service based at least in part on the request to modify the control, wherein the performance standard defines parameters for at least: bandwidth, latency and jitter; and creating, by the processing resource, the communication path performance rule for the network accessible service according to the parameters of the performance standard, wherein the communication path performance rule is not part of the control related to the network accessible service; and creating, by the processing resource, a control rule for the network accessible service, wherein the control rule is a security rule that corresponds to the control related to the network accessible service, wherein the communication path performance rule governs the provider network by which the network accessible service is accessed, and the control rule governs interaction with the network accessible service exclusive of the provider network.

18. The method of claim 1, the method further comprising:

receiving, by the processing resource, a resolved proxy for the network accessible service prior to automatically accessing the performance standard associated with the network accessible service.

* * * * *